(12) United States Patent
Gupta et al.

(10) Patent No.: US 11,076,314 B2
(45) Date of Patent: Jul. 27, 2021

(54) SYSTEMS, METHODS AND DEVICES FOR CONGESTION CONTROL FOR TRANSPORT OF USER DATA VIA A CONTROL PLANE

(71) Applicant: APPLE INC., Cupertino, CA (US)

(72) Inventors: Vivek Gupta, San Jose, CA (US); Puneet Jain, Hillsboro, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/349,219

(22) PCT Filed: Dec. 22, 2017

(86) PCT No.: PCT/US2017/068165
§ 371 (c)(1),
(2) Date: May 10, 2019

(87) PCT Pub. No.: WO2018/125795
PCT Pub. Date: Jul. 5, 2018

(65) Prior Publication Data
US 2020/0196186 A1  Jun. 18, 2020

Related U.S. Application Data

(60) Provisional application No. 62/439,763, filed on Dec. 28, 2016.

(51) Int. Cl.
*H04W 28/02* (2009.01)
*H04W 28/06* (2009.01)

(52) U.S. Cl.
CPC ... *H04W 28/0289* (2013.01); *H04W 28/0247* (2013.01); *H04W 28/0273* (2013.01); *H04W 28/0231* (2013.01); *H04W 28/06* (2013.01)

(58) Field of Classification Search
CPC ....... H04W 60/00; H04W 68/02; H04W 8/08; H04W 76/19; H04W 76/18;
(Continued)

(56) References Cited

U.S. PATENT DOCUMENTS

2014/0153408 A1* 6/2014 Jun .................. H04L 43/10
370/250
2018/0098240 A1* 4/2018 Griot ................ H04W 28/0247
(Continued)

OTHER PUBLICATIONS

3GPP TR 23.730, "3rd Generation Partnership Project; Technical Specification Group Services and System Aspects; Study on extended architecture support for Cellular Internet of Things (CIoT) (Release 14)", V14.0.0, Dec. 2016, 83 pages.
(Continued)

*Primary Examiner* — Oussama Roudani
(74) *Attorney, Agent, or Firm* — Stoel Rives LLP

(57) ABSTRACT

A mobility management entity (MME) can enable overload control of data transmission via control plane in an evolved packet system (EPS), optimized for cellular internet of things (CIoT), by use of a control plane data backoff timer that suppresses the use of control plane for data transfer by a user equipment (UE) for the duration of the timer. For example, an MME sends a control plane data backoff timer to a UE that suppresses the use of control plane for data transfer for the duration of the timer. Alternatively, when an MME load reaches a threshold, an MME triggers an Overload Start message and sends it to the RAN node, so that the RAN node can restrict selecting this MME for UEs requiring data transfer using control plane CIoT optimization. The RAN node can reject these UEs and return a wait timer in an RRC Connection Release message.

7 Claims, 7 Drawing Sheets

(58) Field of Classification Search
CPC ... H04W 84/042; H04W 76/27; H04W 76/28; H04W 88/02; H04W 28/0247; H04W 28/0273; H04W 28/06; H04W 28/0231; H04W 28/0289
See application file for complete search history.

(56) References Cited

U.S. PATENT DOCUMENTS

| | | | |
|---|---|---|---|
| 2019/0141609 A1* | 5/2019 | Kim | H04L 67/10 |
| 2019/0246318 A1* | 8/2019 | Kim | H04W 76/19 |
| 2019/0289571 A1* | 9/2019 | Park | H04W 68/02 |
| 2019/0289646 A1* | 9/2019 | Kim | H04W 8/02 |
| 2019/0320485 A1* | 10/2019 | Kim | H04W 76/25 |

OTHER PUBLICATIONS

3GPP TR 23.730, "3rd Generation Partnership Project; Technical Specification Group Services and System Aspects; Study on extended architecture support for Cellular Internet of Things (CIoT) (Release 14)", V1.3.0, Nov. 2016, 83 pages.
3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 15)", V15.1.0, Sep. 2017, 397 pages.
3GPP TS 24.301, "3rd Generation Partnership Project; Technical Specification Group Core Network and Terminals; Non-Access-Stratum (NAS) protocol for Evolved Packet System (EPS); Stage 3 (Release 13)", V13.6.1, Jun. 2016, 452 pages.
3GPP TS 24.301, "3rd Generation Partnership Project; Technical Specification Group Core Network and Terminals; Non-Access-Stratum (NAS) protocol for Evolved Packet System (EPS); Stage 3 (Release14)", V14.5.0, Sep. 2017, 489 pages.
3GPP TS 24.368, "3rd Generation Partnership Project; Technical Specification Group Core Network and Terminals; Non-Access Stratum (NAS) configuration Management Object (MO) (Release 14)", V14.2.0, Jun. 2017, 20 pages.
3GPP TS 31.102, "3rd Generation Partnership Project; Technical Specification Group Core Network and Terminals; Characteristics of the Universal Subscriber Identity Module (USIM) application (Release 14)", Jun. 2017, 289 pages.
3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 14)", V14.4.0, Sep. 2017, 753 pages.
NEC, QUALCOMM Incorporated, "Congestion control for transport of user data via the control plane", C1-171931, 3GPP TSG-CT WG1 Meeting #103, Spokane, Washington, USA, Version 14.3.0, Apr. 3-7, 2017, 58 pages.
PCT/US17/068165, International Search Report and Written Opinion, dated Mar. 22, 2018, 17 pages.
PCT/US2017/068165, Written Opinion of the International Preliminary Examining Authority, dated Nov. 14, 2018, 9 pages.
QUALCOMM Incorporated, "Backward compatibility in CN Overload Control for CP Optimization", S2-165723, SAWG2 Meeting #117, Kaohsiung, Taiwan, Agenda Item 6.15, Oct. 17-21, 2016, 4 pages.

* cited by examiner

SYSTEMS, METHODS AND DEVICES FOR CONGESTION CONTROL FOR TRANSPORT OF USER DATA VIA A CONTROL PLANE

RELATED APPLICATION

This application is a national stage filing under 35 U.S.C. § 371 of International Patent Application No. PCT/US2017/068165, filed Dec. 22, 2017, which claims the benefit under 35 U.S.C. § 119(e) of U.S. Provisional Application No. 62/439,763 filed Dec. 28, 2016, each of which is hereby incorporated by reference herein in its entirety.

TECHNICAL FIELD

The present disclosure relates to cellular communications and more specifically to congestion control of control plane cellular internet of things (CIoT) evolved packet system (EPS) data transfer by user equipment (UE).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi; and the MulteFire standard developed by MulteFire Alliance. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE) and in MulteFire systems can include a MF-AP. In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable overload control of data transmission via control plane cellular internet of things (CIoT) evolved packet system (EPS) optimization by use of a control plane data backoff timer that suppresses the use of control plane for data transfer by a user equipment (UE) for the duration of the timer. For example, a solution for this control plane data transfer problem can be to develop a control plane data backoff timer that suppresses the use of control plane for data transfer by the UE for the duration of this timer. Another solution is to use an Overload Start message for data transfer via control plane CIoT optimization. When the MME load reaches a threshold, the MME triggers an Overload Start message and sends it to eNB, so that the eNB can restrict selecting this MME for UEs requiring data transfer using control plane CIoT optimization. The eNB can reject these UEs and return a wait timer in an RRC Connection Release message.

In an embodiment of long term evolution (LTE) and/or new radio (NR), the network has enabled data transfer via control plane. This can be used for small data transfers. However, the core network (CN) can protect from overloading by overload control from data transmission via control plane CIoT EPS optimization. While rate control mechanisms can be used, the system can behave better from proper handling of overload due to data transfer via control plane. This system proposes modifications and updates to relevant procedures for specifying a way for handling control plane overload by specifying the above mentioned solutions.

Figure 1:
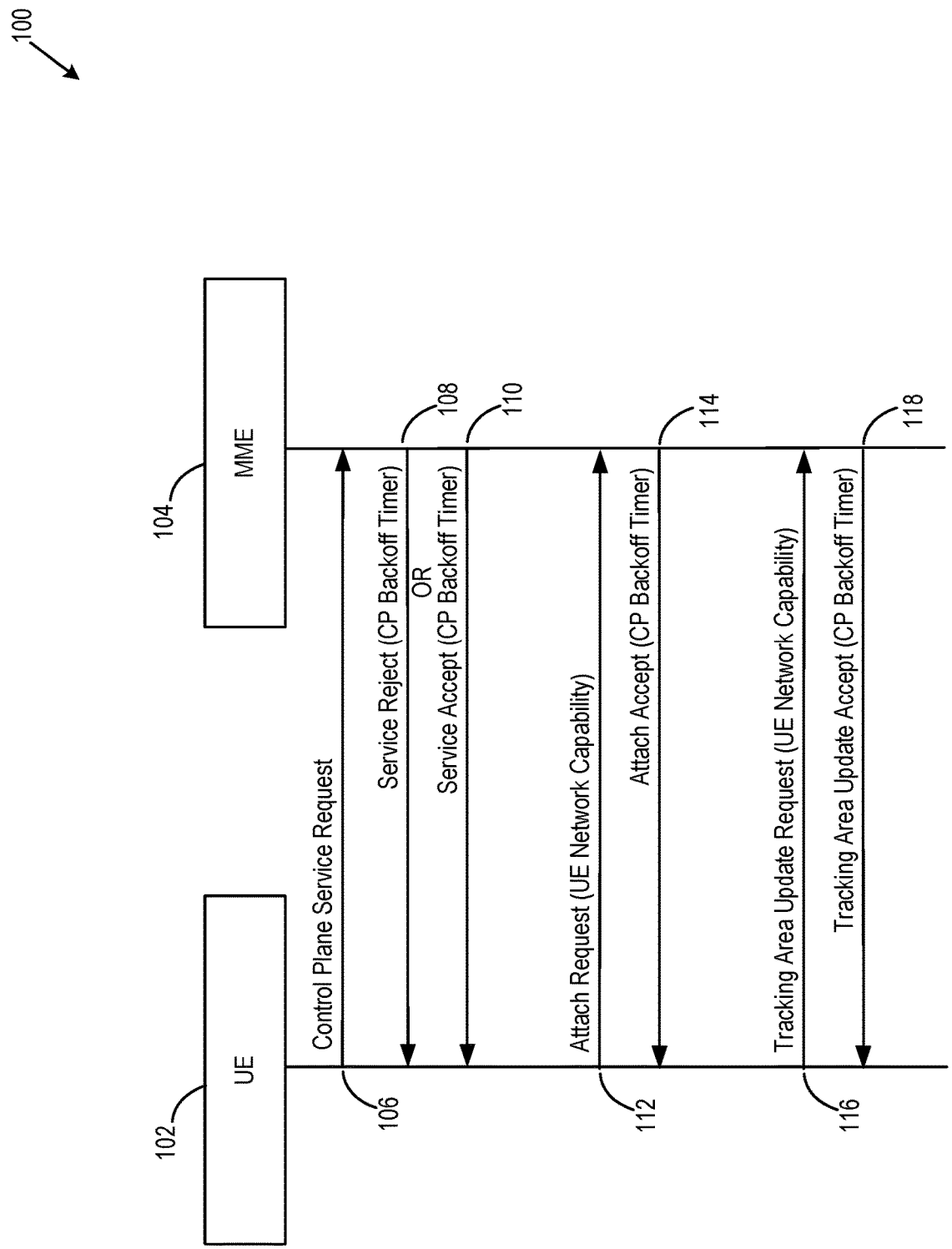
FIG. 1 is a diagram illustrating a communication process for control plane service requests, attach requests and tracking area update (TAU) requests, each of which support a control plane (CP) backoff timer consistent with embodiments disclosed herein.

FIG. 1 is a diagram illustrating a communication process for control plane service requests (CPSR), attach requests and tracking area update requests, each of which support a control plane (CP) backoff timer. When a CP backoff timer is given to a UE, the UE stops CP user data transfer messages until the CP backoff timer expires.

In a first example, a UE 102 sends a control plane service request 106 with user data to an MME 104. The MME 104 can respond 108 to the UE 102 with a service reject message that includes a CP backoff timer. With the service reject response, the UE 102 assumes the user data was not received. The MME 104 can alternatively respond 110 to the UE 102 with a service accept message that includes a CP backoff timer. With the service accept response, the UE 102 assumes the user data was received. In both cases, when a CP backoff timer value is given, the UE 102 stops further CP user data transfer messages until the CP backoff timer expires.

In a second example, the UE 102 sends an attach request 112 to the MME 104 that indicates the UE supports the CP backoff timer (such as in a UE network capability information element (IE)). The MME 104 can respond 108 to the UE 102 with an attach accept message 114 that includes a CP backoff timer. When a CP backoff timer is given, the UE 102 stops CP user data transfer messages until the CP backoff timer expires.

In a third example, the UE 102 sends a tracking area update request 116 to the MME 104 that indicates the UE 102 supports the CP backoff timer (such as in a UE network capability IE). The MME 104 can respond 108 to the UE 102 CPSR message, and if the UE indicates that there is no further downlink data to be sent in routing area identification (RAI) IE in CPSR then the MME may decide to accept the data transfer and send service accept message with control plane backoff timer. Otherwise the MME may send a service reject with cause value #22 congestion control and control plane backoff timer.

In another solution, when the MME is overloaded, the MME may send an Overload Start message to eNB with the Overload Action IE indicating to reject requests from UEs for data transfer via control plane. The eNB may in turn include a wait timer in RRC Connection Reject/Release message.

The following tables show embodiments of support, including information elements, encoding of the information elements and other support systems for the CP backoff timer and control plane data transfer congestion control.

An example of a UE network capability IE can include a control plane backoff timer support (CP backoff timer) (octet 9, bit 3). This bit indicates the support for backoff timer for user data transfer via the control plane. If the indicator is 0, the backoff timer for user data via the control plane not supported. If the indicator is 1, the backoff timer of user data via the control plane supported:

| 8 | 7 | 6 | 5 | 4 | 3 | 2 | 1 | |
|---|---|---|---|---|---|---|---|---|
| UE network capability IEI | | | | | | | | octet 1 |
| Length of UE network capability contents | | | | | | | | octet 2 |
| EEA0 | 128-EEA1 | 128-EEA2 | 128-EEA3 | EEA4 | EEA5 | EEA6 | EEA7 | octet 3 |
| EIA0 | 128-EIA1 | 128-EIA2 | 128-EIA3 | EIA4 | EIA5 | EIA6 | EIA7 | octet 4 |
| UEA0 | UEA1 | UEA2 | UEA3 | UEA4 | UEA5 | UEA6 | UEA7 | octet 5 |
| UCS2 | UIA1 | UIA2 | UIA3 | UIA4 | UIA5 | UIA6 | UIA7 | octet 6 |
| ProSedd | ProSe | H.245-ASH | ACC-CSFB | LPP | LCS | 1 × SR VCC | NF | octet 7 |
| ePCO | HC-CP CIoT | ERw/oPDN | S1-U data | UP CIoT | CP CIoT | Prose-relay | ProSe-dc | octet 8 |
| 0 Spare | 0 Spare | 0 Spare | 0 Spare | 0 Spare | CP Backoff Timer | V2X PC5 | multiple DRB | octet 9 |
| 0 | 0 | 0 | 0 | 0 | 0 | 0 | 0 | octets 10-15 |
| Spare | | | | | | | | |

Note that IEI is an acronym for information element identifier.

with a tracking area update accept message 118 that includes a CP backoff timer. When a CP backoff timer is given, the UE 102 stops CP user data transfer messages until the CP backoff timer expires.

For example, under overload conditions for the control plane, the network may initiate congestion control for the control plane. The UE may indicate support for the control plane backoff timer by setting a control plane backoff timer bit to "backoff timer for user data via the control plane supported" in a UE network capability IE in the attach request or tracking area update request message.

While the control plane backoff timer is running, the UE does not initiate a transfer of user data via the control plane. If the congestion control for user data via the control plane is active and if the UE has indicated support for the user data via the control plane backoff timer, the network can include the value for the control plane backoff timer in attach accept, tracking area update accept, service accept or service reject message.

If the UE sends data piggybacked in an evolved packet system session management (ESM)container as part of An attach accept message can come from the network to a UE. This message is sent by the network to the UE to indicate that the corresponding attach request has been accepted and can include the following content:

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Attach accept message identity | Message type 9.8 | M | V | 1 |
| | EPS attach result | EPS attach result 9.9.3.10 | M | V | 1/2 |
| | Spare half octet | Spare half octet 9.9.2.9 | M | V | 1/2 |
| | T3412 value | GPRS timer 9.9.3.16 | M | V | 1 |

-continued

| IEI | Information Element | Type/Reference | Presence | Format | Length |
|---|---|---|---|---|---|
| | TAI list | Tracking area identity list 9.9.3.33 | M | LV | 7-97 |
| | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16B | O | TLV | 3 |
| 6A | T3324 value | GPRS timer 2 9.9.3.16A | O | TLV | 3 |
| 6E | Extended DRX parameters | Extended DRX parameters 9.9.3.46 | O | TLV | 3 |
| XX | DCN-ID | DCN-ID 9.9.3.48 | O | TLV | 4 |
| YY | Timer_CPBackoff value | GPRS timer 2 9.9.3.16A | O | TLV | 3 |

A service reject message can come from the network to a UE. This message is sent by the network to the UE in order to reject the service request procedure and can include the following content:

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Service reject message identity | Message type 9.8 | M | V | 1 |
| | EMM cause | EMM cause 9.9.3.9 | M | V | 1 |
| 5B | T3442 value | GPRS timer 9.9.3.16 | C | TV | 2 |
| 5F | T3346 value | GPRS timer 2 9.9.3.16A | O | TLV | 3 |
| YY | Timer_CPBackoff_value | GPRS timer 2 9.9.3.16A | O | TLV | 3 |

A tracking area update accept message can come from the network to a UE. This message is sent by the network to the UE to provide the UE with EPS mobility management related data in response to a tracking area update request message and can include the following content:

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Tracking area update accept message identity | Message type 9.8 | M | V | 1 |
| | EPS update result | EPS update result 9.9.3.13 | M | V | 1/2 |
| | Spare half octet | Spare half octet 9.9.2.9 | M | V | 1/2 |
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | 8-98 |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16B | O | TLV | 3 |
| 6A | T3324 value | GPRS timer 2 9.9.3.16A | O | TLV | 3 |
| 6E | Extended DRX parameters | Extended DRX parameters 9.9.3.46 | O | TLV | 3 |
| 68 | Header compression configuration status | Header compression configuration status 9.9.4.27 | O | TLV | 4 |
| XX | DCN-ID | DCN-ID 9.9.3.48 | O | TLV | 4 |
| YY | Timer_CPBackoff value | GPRS timer 2 9.9.3.16A | O | TLV | 3 |

A service accept message can come from the network to a UE. This message is sent by the network in response to a control plane service request message and can include the following content:

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Service accept message identity | Message type 9.8 | M | V | 1 |
| 57 | EPS bearer context status | EPS bearer context status 9.9.2.1 | O | TLV | 4 |
| YY | Timer_CPBackoff value | GPRS timer 2 9.9.3.16A | O | TLV | 3 |

Timers of EPS mobility management can include:

| TIMER NUM. | TIMER VALUE | STATE | CAUSE OF START | NORMAL STOP | ON EXPIRY |
|---|---|---|---|---|---|
| T3402 | Default 12 min. NOTE 1 | EMM-DEREGISTER EMM-REGISTERED | At attach failure and the attempt counter is equal to 5. At tracking area updating failure and the attempt counter is equal to 5. ATTACH ACCEPT with EMM cause #16 or #17 and the attempt counter is equal to 5 for CS/PS mode 2 UE, or ATTACH ACCEPT with EMM cause #22, as described in subclause 5.5.1.3.4.3. TRACKING AREA UPDATE ACCEPT with EMM cause # 16 or # 17 and the attempt counter is equal to 5 for CS/PS mode 2 UE, TRACKING AREA UPDATE ACCEPT with EMM cause # 16 or # 17 and the attempt counter is equal to 5 for CS/PS mode 1 UE with "IMS voice not available" and with a persistent EPS bearer context, or TRACKING AREA UPDATE ACCEPT with EMM cause #22, as described in subclause 5.5.3.3.4.3. | ATTACH REQUEST sent TRACKING AREA UPDATE REQUEST sent NAS signaling connection released | Initiation of the attach procedure, if still required or TAU procedure |
| Timer CP | Note 10 | All except EMM-NULL | ATTACH ACCEPT message or TRACKING AREA UPDATE ACCEPT message or SERVICE ACCEPT message received with a non-zero Timer CP_BackOff value. SERVICE REJECT message received with EMM cause #22 "Congestion" and a non-zero Timer CP_Backoff value. | ESM DATA TRANSPORT message received. | UE can send CONTROL PLANE SERVICE REQUEST message along with ESM message container. |

In some embodiments, the handling of NAS level mobility management congestion control can be started by the network. Under overload conditions for the control plane, the network may initiate congestion control for the control plane. The UE may indicate support for the control plane backoff timer by setting the CP backoff timer bit to "backoff timer for user data via the control plane supported" in the UE network capability IE in the attach request or tracking area update request message. While the CP backoff timer is running, the UE shall not initiate a transfer of user data via the control plane, except if the UE is allowed to use exception data reporting (see the ExceptionDataReportingAllowed leaf of the NAS configuration MO) and the user data is related to an exceptional event.

If the congestion control for user data via the control plane is active and if the UE has indicated support for the user data via the control plane backoff timer, the network may include the value for the control plane backoff timer (also known as the CP Backoff Timer) in attach accept, tracking area update accept, service accept or service reject message.

In some embodiments, the UE is using EPS services with control plane CIoT EPS optimization. The MME may include the CP Backoff Timer IE in the service accept message. If the CP Backoff Timer IE is present in the service accept message received by the UE, the UE shall consider the delivery of ESM data transport message as successful. The UE shall stop the CP Backoff Timer if running and start the CP Backoff Timer with the value received.

In some embodiments, the service request procedure is not accepted by the network. If control plane congestion control is active and if the network rejects the service request due to control plane congestion control, the MME shall include the CP Backoff Timer IE in the service reject message and set the EMM cause value to #22. EMM cause Value #22 is for congestion. If the UE is using EPS services with control plane CIoT optimizations and the CP Backoff Timer IE is present in the service reject message received by the UE, the UE shall consider the delivery of ESM data transport message as unsuccessful. The UE shall stop the CP Backoff Timer if running and start the CP Backoff Timer with the value received if it is integrity protected, otherwise the UE may choose a random value from the default range of the CP Backoff Timer.

In some embodiments, the Overload Action IE indicates which signaling traffic is subject to rejection by the eNB in an MME overload situation. The Overload Action IE can include:

| IE/Group Name | Presence | Range | IE type and reference | Semantics description |
|---|---|---|---|---|
| Overload | M | | ENUMERATED (Reject RRC connection establishments for non-emergency MO DT, Reject RRC connection establishments for Signaling, Permit Emergency Sessions and mobile terminated services only,..., Permit High Priority Sessions and mobile terminated services only, Reject delay tolerant access, Reject RRC connection establishments for C-Plane CIoT data transfer) | |

In some embodiments, if the Overload Action IE in the Overload Response IE within the Overload Start message is set to: "reject RRC connection establishments for non-emergency mobile originated data transfer" (i.e., reject traffic corresponding to RRC cause "mo-data", "mo-VoiceCall" and "delayTolerantAccess"), or "reject RRC connection establishments for signaling" (i.e., reject traffic corresponding to RRC cause "mo-data", "mo-signaling", "mo-VoiceCall" and "delayTolerantAccess"), or "only permit RRC connection establishments for emergency sessions and mobile terminated services" (i.e., only permit traffic corresponding to RRC cause "emergency" and "mt-Access"), or "only permit RRC connection establishments for high priority sessions and mobile terminated services" (i.e., only permit traffic corresponding to RRC cause "highPriorityAccess" and "mt-Access"), or "reject only RRC connection establishment for delay tolerant access" (i.e., only reject traffic corresponding to RRC cause "delayTolerantAccess"), or "reject RRC connection establishments for C-Plane CIoT data transfer" (i.e., reject traffic corresponding to RRC cause "mo-data" and "mt-access"), the eNB shall if the Traffic Load Reduction Indication IE is included in the Overload Start message and, if supported, reduce the signaling traffic indicated as to be rejected by the indicated percentage; otherwise ensure that the signaling traffic not indicated as to be rejected is sent to the MME.

Figure 2:
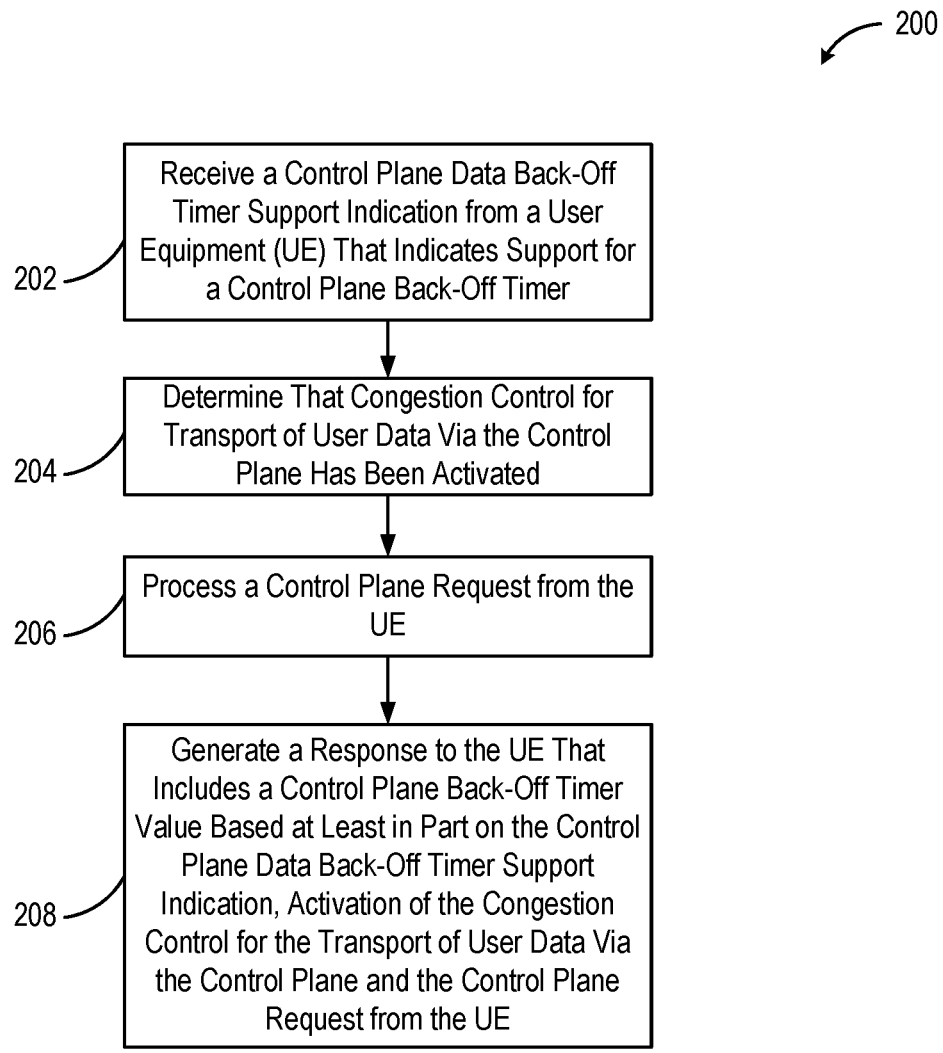
FIG. 2 is a flow chart illustrating a method of congestion control for transport of user data via a control plane consistent with embodiments disclosed herein.
Figure 3:
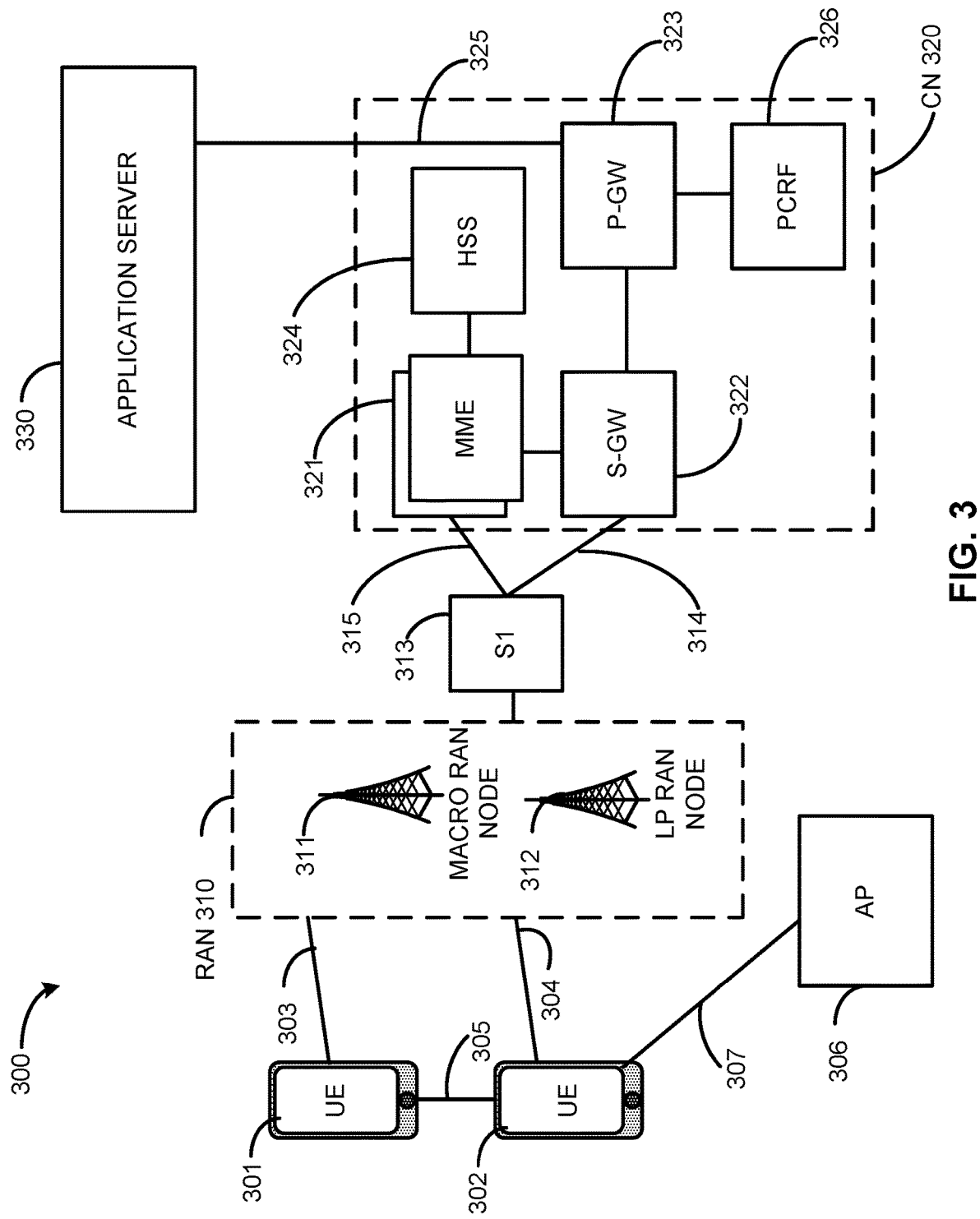
FIG. 3 illustrates an architecture of a system of a network consistent with embodiments disclosed herein.

FIG. 2 is a flow chart illustrating a method 200 of congestion control for transport of user data via a control plane. The method can be accomplished by system such as shown in FIGS. 1 and 3, among others, and by devices including UE 301 and MME 321 in FIG. 3. In block 202, the MME receives a control plane data backoff timer support indication from a UE that indicates support for a control plane backoff timer. In block 204, the MME determines that congestion control for transport of user data via the control plane has been activated. In block 206, the MME processes a control plane request from the UE. In block 208, the MME generates a response to the UE that includes a control plane backoff timer value based at least in part on the control plane data backoff timer support indication, activation of the congestion control for the transport of user data via the control plane and the control plane request from the UE.

FIG. 3 illustrates an architecture of a system 300 of a network in accordance with some embodiments. The system 300 is shown to include a user equipment (UE) 301 and a UE 302. The UEs 301 and 302 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 301 and 302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 and 302 may be configured to connect, e.g., communicatively couple, with a radio access network (RAN) 310. The RAN 310 may be, for example, an Evolved Universal Mobile Telecommunications System (UMTS) Terrestrial Radio Access Network (E-UTRAN), a NextGen RAN (NG RAN), or some other type of RAN. The UEs 301 and 302 utilize connections 303 and 304, respectively, each of which comprises a physical communications interface or layer (discussed in further detail below); in this example, the connections 303 and 304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 301 and 302 may further directly exchange communication data via a ProSe interface 305. The ProSe interface 305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 302 is shown to be configured to access an access point (AP) 306 via a connection 307. The connection 307 can comprise a local wireless connection, such as a connection consistent with any IEEE 802.11 protocol, wherein the AP 306 would comprise a wireless fidelity (WiFi®) router. In this example, the AP 306 may be connected to the Internet without connecting to the core network of the wireless system (described in further detail below).

In some embodiments, a MulteFire (MF) system can be used (not shown) and a MulteFire AP (MF-AP) can service a wireless connection with UE. A connection can comprise a local wireless connection, such as a connection consistent with the MulteFire protocol, wherein the MF-AP comprises a MF router. In this example, the MF-AP can be connected to the Internet without connecting to the core network of the wireless system. As MulteFire can use unlicensed spectrum, a MF-AP can be deployed by almost any entity or person with similar or same restrictions as WLAN hotspots.

The RAN 310 can include one or more access nodes that enable the connections 303 and 304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 310 may include one or more RAN nodes for providing macrocells, e.g., a macro RAN node 311, and one or more RAN nodes for providing femtocells or picocells (e.g., cells having smaller coverage areas, smaller user capacity, or higher bandwidth compared to macrocells), e.g., a low power (LP) RAN node 312.

Any of the RAN nodes 311 and 312 can terminate the air interface protocol and can be the first point of contact for the UEs 301 and 302. In some embodiments, any of the RAN nodes 311 and 312 can fulfill various logical functions for the RAN 310 including, but not limited to, radio network controller (RNC) functions such as radio bearer management, uplink and downlink dynamic radio resource management and data packet scheduling, and mobility management.

In accordance with some embodiments, the UEs 301 and 302 can be configured to communicate using Orthogonal Frequency-Division Multiplexing (OFDM) communication signals with each other or with any of the RAN nodes 311 and 312 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 and 312 to the UEs 301 and 302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 301 and 302. The physical downlink control channel (PDCCH) may carry information about the transport format and resource allocations related to the PDSCH channel, among other things. It may also inform the UEs 301 and 302 about the transport format, resource allocation, and H-ARQ (Hybrid Automatic Repeat Request) information related to the uplink shared channel. Typically, downlink scheduling (assigning control and shared channel resource blocks to the UE 302 within a cell) may be performed at any of the RAN nodes 311 and 312 based on channel quality information fed back from any of the UEs 301 and 302. The downlink resource assignment information may be sent on the PDCCH used for (e.g., assigned to) each of the UEs 301 and 302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 310 is shown to be communicatively coupled to a core network (CN) 320—via an S1 interface 313. In embodiments, the CN 320 may be an evolved packet core (EPC) network, a NextGen Packet Core (NPC) network, or some other type of CN. In this embodiment the S1 interface 313 is split into two parts: an S1-U interface 314, which carries traffic data between the RAN nodes 311 and 312 and a serving gateway (S-GW) 322, and an S1-mobility management entity (MME) interface 315, which is a signaling interface between the RAN nodes 311 and 312 and MMEs 321.

In this embodiment, the CN 320 comprises the MMEs 321, the S-GW 322, a Packet Data Network (PDN) Gateway (P-GW) 323, and a home subscriber server (HSS) 324. The MMEs 321 may be similar in function to the control plane of legacy Serving General Packet Radio Service (GPRS) Support Nodes (SGSN). The MMEs 321 may manage mobility aspects in access such as gateway selection and tracking area list management. The HSS 324 may comprise a database for network users, including subscription-related information to support the network entities' handling of communication sessions. The CN 320 may comprise one or several HSSs 324, depending on the number of mobile subscribers, on the capacity of the equipment, on the organization of the network, etc. For example, the HSS 324 can provide support for routing/roaming, authentication, authorization, naming/addressing resolution, location dependencies, etc.

The S-GW 322 may terminate the S1 interface 313 towards the RAN 310, and routes data packets between the RAN 310 and the CN 320. In addition, the S-GW 322 may be a local mobility anchor point for inter-RAN node handovers and also may provide an anchor for inter-3GPP mobility. Other responsibilities may include lawful intercept, charging, and some policy enforcement.

The P-GW 323 may terminate an SGi interface toward a PDN. The P-GW 323 may route data packets between the CN 320 (e.g., an EPC network) and external networks such as a network including an application server 330 (alternatively referred to as application function (AF)) via an Internet Protocol (IP) interface 325. Generally, the application server 330 may be an element offering applications that use IP bearer resources with the core network (e.g., UMTS Packet Services (PS) domain, LTE PS data services, etc.). In this embodiment, the P-GW 323 is shown to be communicatively coupled to the application server 330 via the IP communications interface 325. The application server 330 can also be configured to support one or more communication services (e.g., Voice-over-Internet Protocol (VoIP) sessions, PTT sessions, group communication sessions, social networking services, etc.) for the UEs 301 and 302 via the CN 320.

The P-GW 323 may further be a node for policy enforcement and charging data collection. A Policy and Charging Enforcement Function (PCRF) 326 is the policy and charging control element of the CN 320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate Quality of Service (QoS) and charging parameters. The PCRF 326 may provision this rule into a Policy and Charging Enforcement Function (PCEF) (not shown) with the appropriate traffic flow template (TFT) and QoS class of identifier (QCI), which commences the QoS and charging as specified by the application server 330.

Figure 4:
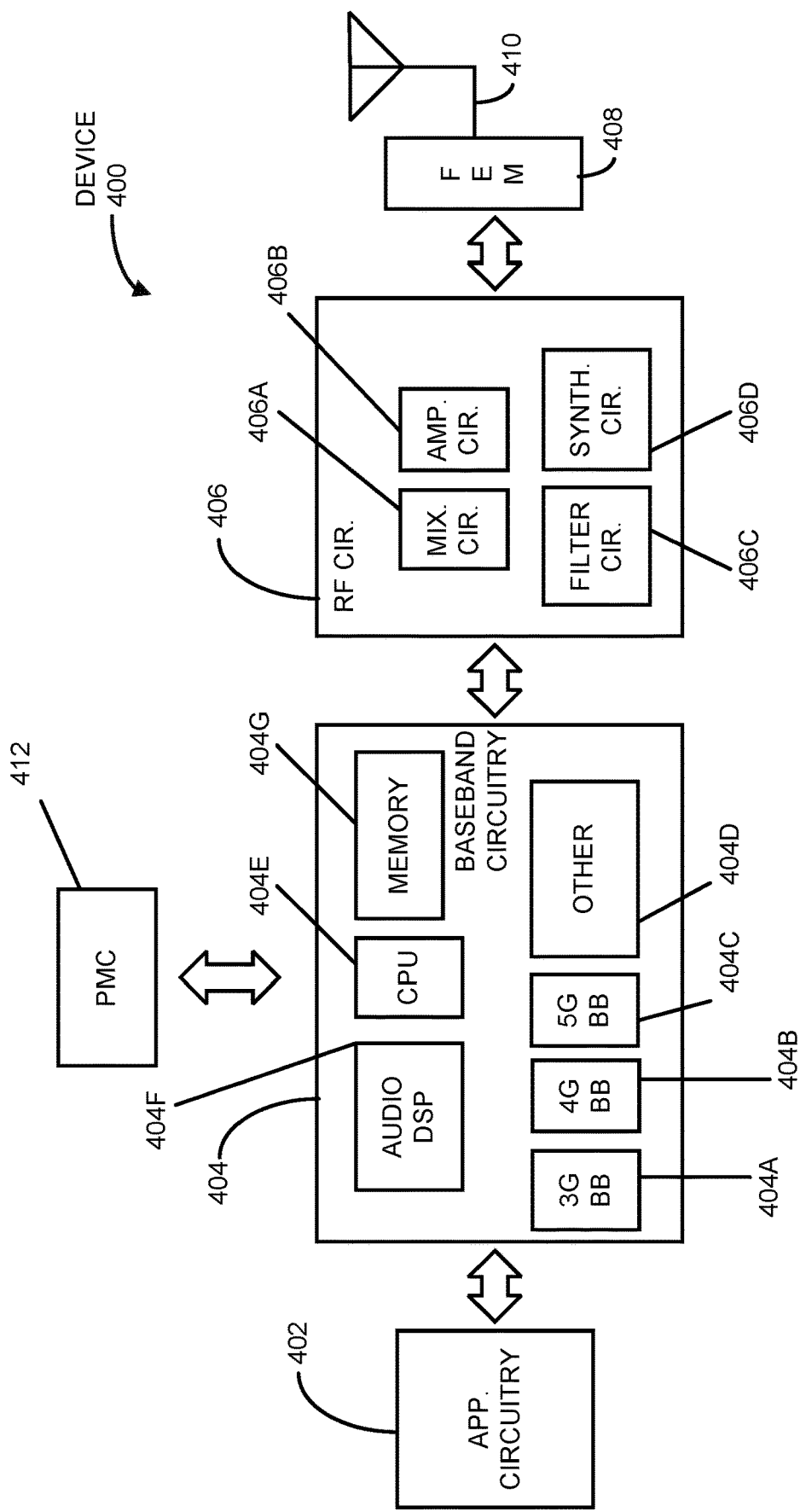
FIG. 4 illustrates example components of a device consistent with embodiments disclosed herein.

FIG. 4 illustrates example components of a device 400 in accordance with some embodiments. In some embodiments, the device 400 may include application circuitry 402, baseband circuitry 404, Radio Frequency (RF) circuitry 406, front-end module (FEM) circuitry 408, one or more antennas 410, and power management circuitry (PMC) 412 coupled together at least as shown. The components of the illustrated device 400 may be included in a UE or a RAN node. In some embodiments, the device 400 may include fewer elements (e.g., a RAN node may not utilize the application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of the application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 406 and to generate baseband signals for a transmit signal path of the RF circuitry 406. The baseband processing circuity 404 may interface with the application circuitry 402 for generation and processing of the baseband signals and for controlling operations of the RF circuitry 406. For example, in some embodiments, the baseband circuitry 404 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (e.g., second generation (2G), sixth generation (6G), etc.). The baseband circuitry 404 (e.g., one or more of baseband processors 404A-D) may handle various radio control functions that enable communication with one or more radio networks via the RF circuitry 406. In other embodiments, some or all of the functionality of the baseband processors 404A-D may be included in modules stored in a memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include one or more audio digital signal processor(s) (DSP) 404F. The audio DSP(s) 404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (E-UTRAN) or other wireless metropolitan area networks (WMAN), a wireless local area network (WLAN), or a wireless personal area network (WPAN). Embodiments in which the baseband circuitry 404 is configured to support radio communications of more than one wireless protocol may be referred to as multi-mode baseband circuitry.

The RF circuitry 406 may enable communication with wireless networks using modulated electromagnetic radiation through a non-solid medium. In various embodiments, the RF circuitry 406 may include switches, filters, amplifiers, etc., to facilitate the communication with the wireless network. The RF circuitry 406 may include a receive signal path which may include circuitry to down-convert RF signals received from the FEM circuitry 408 and provide baseband signals to the baseband circuitry 404. The RF circuitry 406 may also include a transmit signal path which may include circuitry to up-convert baseband signals provided by the baseband circuitry 404 and provide RF output signals to the FEM circuitry 408 for transmission.

In some embodiments, the receive signal path of the RF circuitry 406 may include mixer circuitry 406A, amplifier circuitry 406B and filter circuitry 406C. In some embodiments, the transmit signal path of the RF circuitry 406 may include the filter circuitry 406C and the mixer circuitry 406A. The RF circuitry 406 may also include synthesizer circuitry 406D for synthesizing a frequency for use by the mixer circuitry 406A of the receive signal path and the transmit signal path. In some embodiments, the mixer circuitry 406A of the receive signal path may be configured to down-convert RF signals received from the FEM circuitry 408 based on the synthesized frequency provided by the synthesizer circuitry 406D. The amplifier circuitry 406B may be configured to amplify the down-converted signals and the filter circuitry 406C may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, the mixer circuitry 406A of the receive signal path may comprise passive mixers, although the scope of the embodiments is not limited in this respect.

In some embodiments, the mixer circuitry 406A of the transmit signal path may be configured to up-convert input baseband signals based on the synthesized frequency provided by the synthesizer circuitry 406D to generate RF output signals for the FEM circuitry 408. The baseband signals may be provided by the baseband circuitry 404 and may be filtered by the filter circuitry 406C.

In some embodiments, the mixer circuitry 406A of the receive signal path and the mixer circuitry 406A of the transmit signal path may include two or more mixers and may be arranged for quadrature downconversion and upconversion, respectively. In some embodiments, the mixer circuitry 406A of the receive signal path and the mixer circuitry 406A of the transmit signal path may include two or more mixers and may be arranged for image rejection (e.g., Hartley image rejection). In some embodiments, the mixer circuitry 406A of the receive signal path and the mixer circuitry 406A may be arranged for direct downconversion and direct upconversion, respectively. In some embodiments, the mixer circuitry 406A of the receive signal path and the mixer circuitry 406A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406D may be a fractional-N synthesizer or a fractional N/N+1 synthesizer, although the scope of the embodiments is not limited in this respect as other types of frequency synthesizers may be suitable. For example, the synthesizer circuitry 406D may be a delta-sigma synthesizer, a frequency multiplier, or a synthesizer comprising a phase-locked loop with a frequency divider.

The synthesizer circuitry 406D may be configured to synthesize an output frequency for use by the mixer circuitry 406A of the RF circuitry 406 based on a frequency input and a divider control input. In some embodiments, the synthesizer circuitry 406D may be a fractional N/N+1 synthesizer.

In some embodiments, frequency input may be provided by a voltage controlled oscillator (VCO), although that is not a requirement. Divider control input may be provided by either the baseband circuitry 404 or the application circuitry 402 (such as an applications processor) depending on the desired output frequency. In some embodiments, a divider control input (e.g., N) may be determined from a look-up table based on a channel indicated by the application circuitry 402.

The synthesizer circuitry 406D of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 406D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

The FEM circuitry 408 may include a receive signal path which may include circuitry configured to operate on RF signals received from the one or more antennas 410, amplify the received signals and provide the amplified versions of the received signals to the RF circuitry 406 for further processing. The FEM circuitry 408 may also include a transmit signal path which may include circuitry configured to amplify signals for transmission provided by the RF circuitry 406 for transmission by one or more of the one or more antennas 410. In various embodiments, the amplification through the transmit or receive signal paths may be done solely in the RF circuitry 406, solely in the FEM circuitry 408, or in both the RF circuitry 406 and the FEM circuitry 408.

In some embodiments, the FEM circuitry 408 may include a TX/RX switch to switch between transmit mode and receive mode operation. The FEM circuitry 408 may include a receive signal path and a transmit signal path. The receive signal path of the FEM circuitry 408 may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by the RF circuitry 406), and one or more filters to generate RF signals for subsequent transmission (e.g., by one or more of the one or more antennas 410).

In some embodiments, the PMC 412 may manage power provided to the baseband circuitry 404. In particular, the PMC 412 may control power-source selection, voltage scaling, battery charging, or DC-to-DC conversion. The PMC 412 may often be included when the device 400 is capable of being powered by a battery, for example, when the device 400 is included in a UE. The PMC 412 may increase the power conversion efficiency while providing desirable implementation size and heat dissipation characteristics.

FIG. 4 shows the PMC 412 coupled only with the baseband circuitry 404. However, in other embodiments, the PMC 412 may be additionally or alternatively coupled with, and perform similar power management operations for, other components such as, but not limited to, the application circuitry 402, the RF circuitry 406, or the FEM circuitry 408.

In some embodiments, the PMC 412 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used to execute Layer 3, Layer 2, or Layer 1 functionality, while processors of the application circuitry 402 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 5:
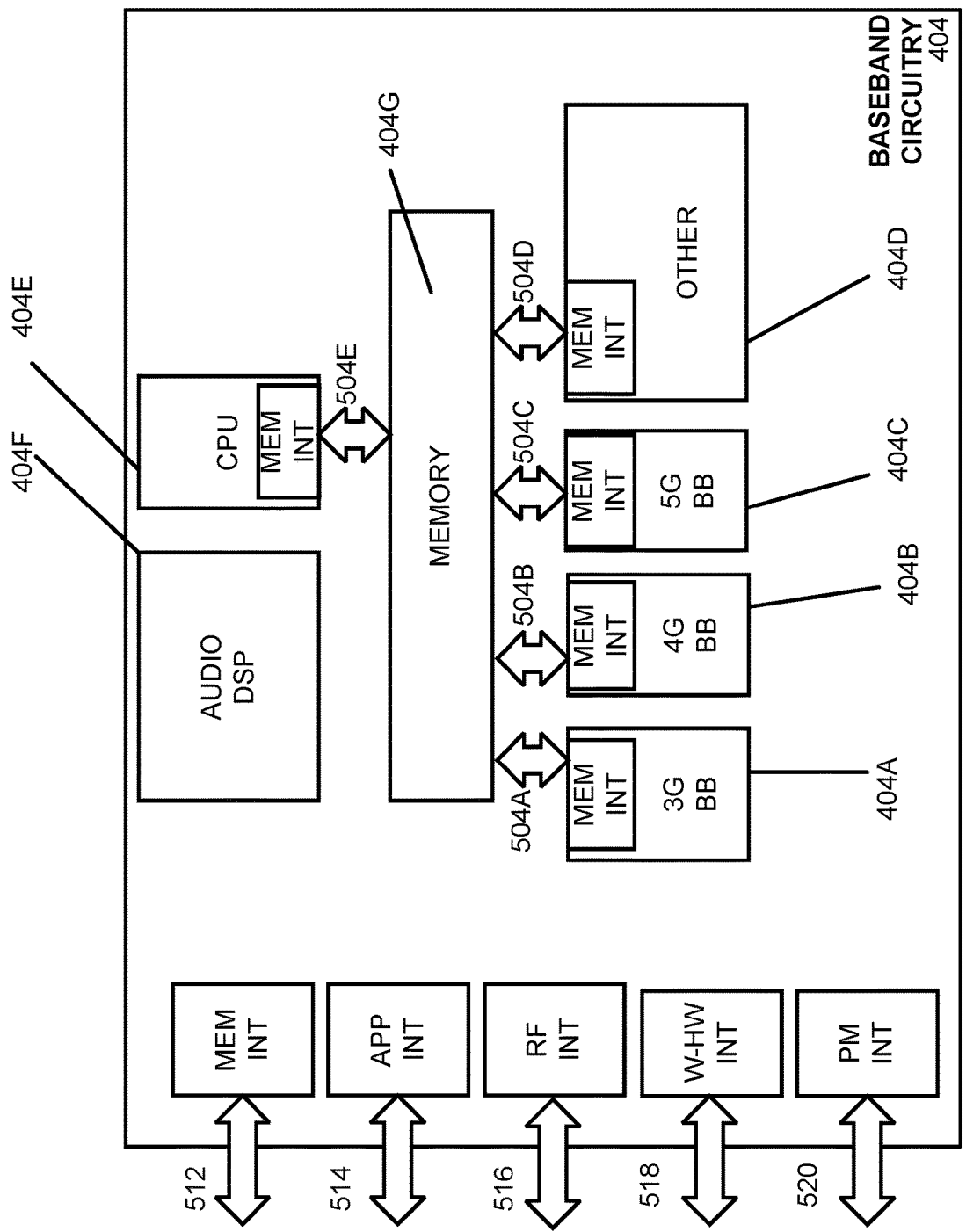
FIG. 5 illustrates example interfaces of baseband circuitry consistent with embodiments disclosed herein.

FIG. 5 illustrates example interfaces of baseband circuitry in accordance with some embodiments. As discussed above, the baseband circuitry 404 of FIG. 4 may comprise the processors 404A-404E and the memory 404G utilized by said processors. Each of the processors 404A-404E may include a memory interface, 504A-504E, respectively, to send/receive data to/from the memory 404G.

The baseband circuitry 404 may further include one or more interfaces to communicatively couple to other circuitries/devices, such as a memory interface 512 (e.g., an interface to send/receive data to/from memory external to the baseband circuitry 404), an application circuitry interface 514 (e.g., an interface to send/receive data to/from the application circuitry 402 of FIG. 4), an RF circuitry interface 516 (e.g., an interface to send/receive data to/from the RF circuitry 406 of FIG. 4), a wireless hardware connectivity interface 518 (e.g., an interface to send/receive data to/from Near Field Communication (NFC) components, Bluetooth® components (e.g., Bluetooth® Low Energy), Wi-Fi® components, and other communication components), and a power management interface 520 (e.g., an interface to send/receive power or control signals to/from the PMC 412.

Figure 6:
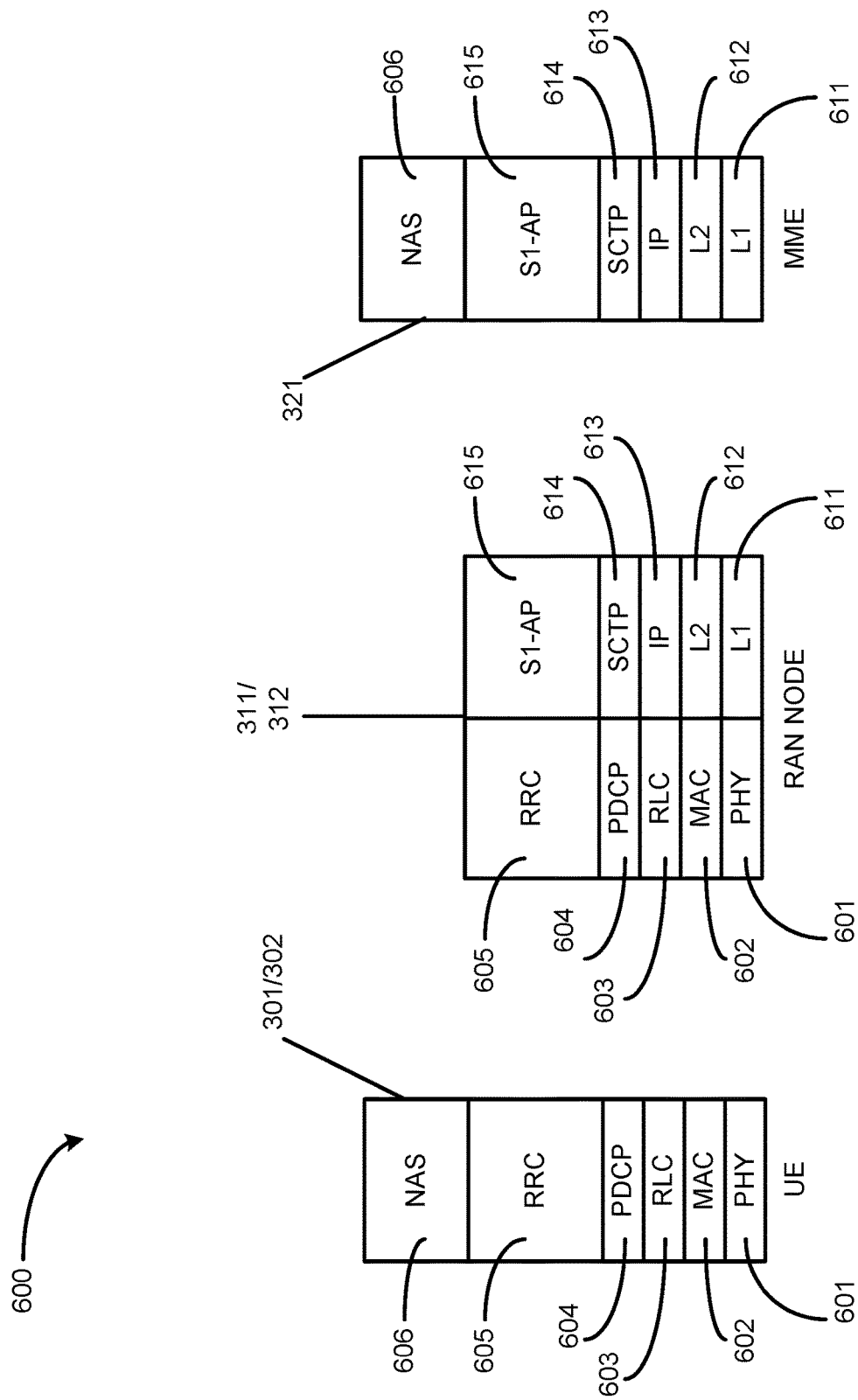
FIG. 6 is an illustration of a control plane protocol stack consistent with embodiments disclosed herein.

FIG. 6 is an illustration of a control plane protocol stack in accordance with some embodiments. In this embodiment, a control plane 600 is shown as a communications protocol stack between the UE 301 (or alternatively, the UE 302), the RAN node 311 (or alternatively, the RAN node 312), and the MME 321.

A PHY layer 601 may transmit or receive information used by a MAC layer 602 over one or more air interfaces. The PHY layer 601 may further perform link adaptation or adaptive modulation and coding (AMC), power control, cell search (e.g., for initial synchronization and handover purposes), and other measurements used by higher layers, such as an RRC layer 605. The PHY layer 601 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 602 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 603 may operate in a plurality of modes of operation, including: Transparent Mode (TM), Unacknowledged Mode (UM), and Acknowledged Mode (AM). The RLC layer 603 may execute transfer of upper layer protocol data units (PDUs), error correction through automatic repeat request (ARQ) for AM data transfers, and concatenation, segmentation and reassembly of RLC SDUs for UM and AM data transfers. The RLC layer 603 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 604 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 605 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 301 and the RAN node 311 may utilize a Uu interface (e.g., an LTE-Uu interface) to exchange control plane data via a protocol stack comprising the PHY layer 601, the MAC layer 602, the RLC layer 603, the PDCP layer 604, and the RRC layer 605.

In the embodiment shown, the non-access stratum (NAS) protocols 606 form the highest stratum of the control plane between the UE 301 and the MME 321. The NAS protocols 606 support the mobility of the UE 301 and the session management procedures to establish and maintain IP connectivity between the UE 301 and the P-GW 323.

An S1 Application Protocol (S1-AP) layer 615 may support the functions of the S1 interface and comprise Elementary Procedures (EPs). An EP is a unit of interaction between the RAN node 311 and the CN 320. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

A Stream Control Transmission Protocol (SCTP) layer (alternatively referred to as the stream control transmission protocol/internet protocol (SCTP/IP) layer) 614 may ensure reliable delivery of signaling messages between the RAN node 311 and the MME 321 based, in part, on the IP protocol, supported by an IP layer 613. An L2 layer 612 and an L1 layer 611 may refer to communication links (e.g., wired or wireless) used by the RAN node and the MME to exchange information.

The RAN node 311 and the MME 321 may utilize an S1-MME interface to exchange control plane data via a protocol stack comprising the L1 layer 611, the L2 layer 612, the IP layer 613, the SCTP layer 614, and the S1-AP layer 615.

Figure 7:
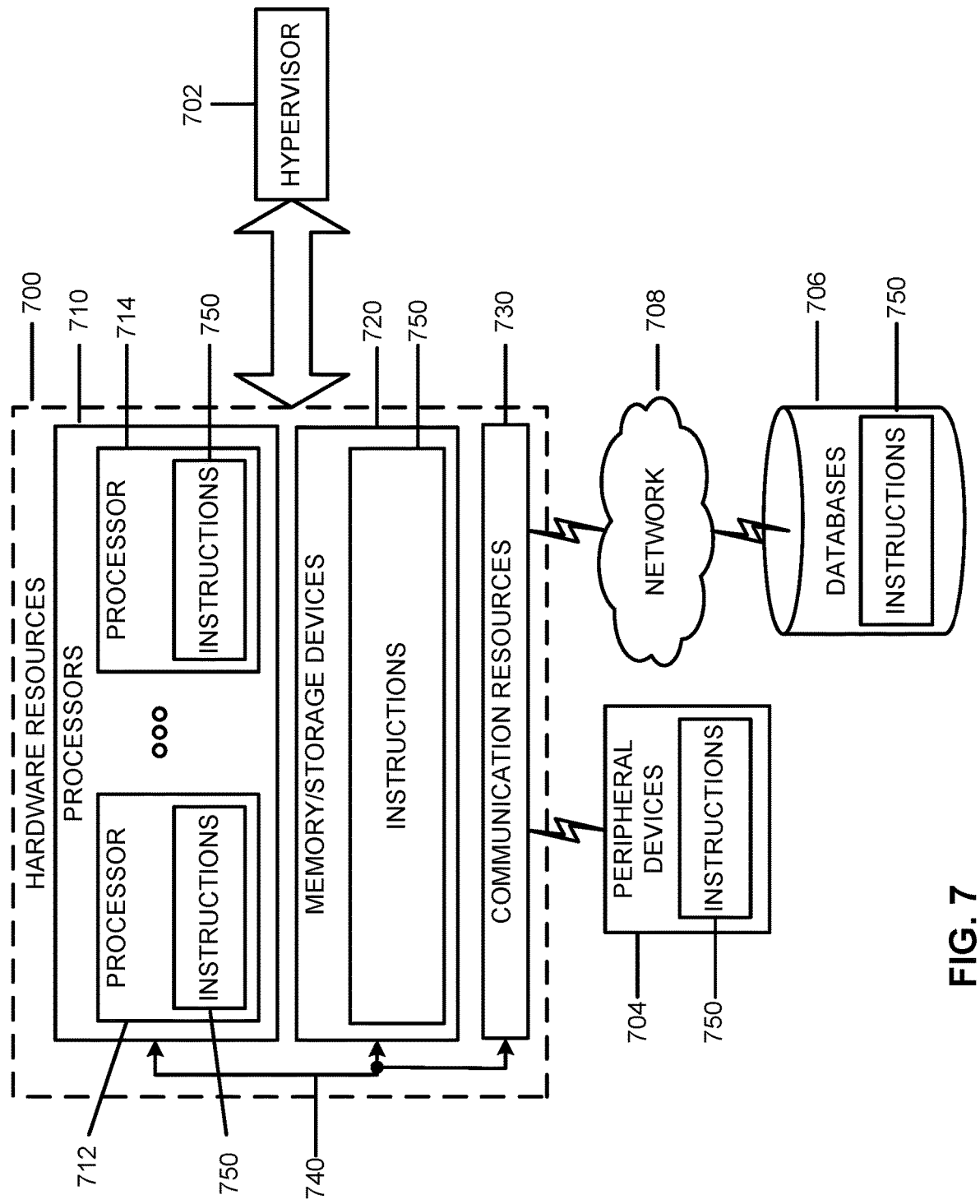
FIG. 7 is a block diagram illustrating components able to read instructions from a machine-readable or computer-readable medium and perform any one or more of the methodologies discussed herein.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., NFV) is utilized, a hypervisor 702 may be executed to provide an execution environment for one or more network slices/sub-slices to utilize the hardware resources 700.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Examples

The following examples pertain to further embodiments.

Example 1 is an apparatus for a user equipment (UE), comprising a memory interface and a processor. The memory interface sends and receives a control plane data backoff timer value. The processor is coupled to the memory interface, the processor configured to: generate, for a mobility management entity (MME), an indication of support for a control plane data backoff timer for control plane user data transmissions; generate a control plane message that includes user data for transmission to the MME; process a response to the control plane message that includes the control plane data backoff timer value from the MME; and delay transmissions of further control plane messages with user data to the MME until after expiration of the control plane data backoff timer.

Example 2 is the apparatus of Example 1, wherein the control plane message with the user data is a control plane service request (CPSR) with evolved packet system session management (ESM) data transport message, the ESM data transport message including the user data.

Example 3 is the apparatus of Example 1, wherein the indication of support for the control plane data backoff timer is provided in a UE network capability information element (IE) in an attach request or tracking area update request.

Example 4 is the apparatus of Example 1, wherein the control plane message further comprises an evolved packet system session management (ESM) container that includes user data.

Example 5 is the apparatus of Example 1, wherein to process the response to the control plane message further comprises: process a service accept message; and consider a transport of user data via the control plane as successful.

Example 6 is the apparatus of Example 1, wherein to process the response to the control plane message further comprises: process a service reject message; and consider a transport of user data via the control plane as unsuccessful.

Example 7 is the apparatus of any of Examples 1-6, wherein to process the response to the control plane message further comprises to stop a backoff timer and start the backoff timer with the control plane data backoff timer value.

Example 8 is the apparatus of any of Examples 1-6, wherein the processor is a baseband processor.

Example 9 is an apparatus for a radio access network (RAN) node, comprising a memory and a processor. The a memory interface sends and receives a wait timer value for a user equipment (UE). The processor is configured to: process an overload start message from a mobility management entity (MME) indicating to reject requests from UEs for data transfer via a control plane; process a radio resource control (RRC) connection request from a UE for control plane cellular internet of things (CIoT) data transfer; and generate a response to the RRC connection request that includes the wait timer value for data transfers via the control plane.

Example 10 is the apparatus of Example 9, wherein the overload start message includes an overload action information element.

Example 11 is the apparatus of Example 9, wherein the response to the RRC connection request is a rejection message or a release message.

Example 12 is the apparatus of Example 1, wherein the RRC connection request from the UE indicates a selection of the MME.

Example 13 is the apparatus of any of Examples 9-11, wherein the wait timer value is present in an information element within the response to the RRC connection request.

Example 14 is the apparatus of any of Examples 9-11, wherein a set of wait timer values, which includes the wait timer value, are not synchronized across UEs.

Example 15 is the apparatus of any of Examples 9-11, wherein the processor is a baseband processor.

Example 16 is a method of congestion control for transport of user data via a control plane, the method comprising: receiving a control plane data back-off timer support indication from a user equipment (UE) that indicates support for a control plane back-off timer; determining that congestion control for transport of user data via the control plane has been activated; processing a control plane request from the UE; and generating a response to the UE that includes a control plane back-off timer value based at least in part on the control plane data back-off timer support indication, activation of the congestion control for the transport of user data via the control plane and the control plane request from the UE.

Example 17 is the method of Example 16, wherein the response to the UE is an attach accept message, tracking area update accept message, service accept message, or service reject message.

Example 18 is the method of Example 16, wherein the control plane request from the UE is a control plane service request, attach request, or tracking update request.

Example 19 is the method of Example 16, wherein a set of control plane back-off timer values, which includes the control plane back-off timer value, provided to a set of UEs are not synchronized.

Example 20 is the method of Example 16, wherein the control plane request from the UE includes the control plane data back-off timer support indication.

Example 21 is the method of Example 20, wherein the control plane request is an attach request or tracking update request.

Example 22 is an apparatus comprising means to perform a method as Exemplified in any of Examples 16-21.

Example 23. Machine-readable storage including machine-readable instructions, when executed, to implement a method or realize an apparatus as Exemplified in any of Examples 16-21.

Example 24 is a machine readable medium including code, when executed, to cause a machine to perform the method of any one of Examples 16-21.

Example 25 is a computer program product comprising a computer-readable storage medium that stores instructions for execution by a processor to perform operations of a mobility management entity (MME), the operations, when executed by the processor, to perform a method, the method comprising: receiving a control plane data back-off timer support indication from a user equipment (UE) that indicates support for a control plane back-off timer; determining that congestion control for transport of user data via a control plane has been activated; processing a control plane request from the UE; and generating a response to the UE that includes a control plane back-off timer value based at least in part on the control plane data back-off timer support indication, activation of the congestion control for the transport of user data via the control plane and the control plane request from the UE.

Example 26 is an apparatus mobility management entity (MME), the apparatus comprising: means for receiving a control plane data back-off timer support indication from a user equipment (UE) that indicates support for a control plane back-off timer; means for determining that congestion control for transport of user data via a control plane has been activated; means for processing a control plane request from the UE; and means for generating a response to the UE that includes a control plane back-off timer value based at least in part on the control plane data back-off timer support indication, activation of the congestion control for the transport of user data via the control plane and the control plane request from the UE.

Additional Examples

Additional Example 1 may include a user equipment (UE) device that has enhancements and optimizations for features and capabilities relating to Cellular Internet of Things (CIoT) for connecting to an EPS network that is also enhanced for CIoT features. The EPS network may include entities such as eNB, MME, SGW, PGW, SCEF (Service Capability Exposure Function), etc.

Additional Example 2 may include the UE of Additional Example 1 and/or some other Additional Example herein, wherein the UE needs to transfer Mobile Originated data via control plane to MME and the network needs to transfer Mobile Terminated (MT) data via control plane to the UE and the control plane in the network is overloaded.

Additional Example 3 may include the UE of Additional Example 2 and/or some other Additional Example herein, wherein the UE indicates support for control plane backoff timer in UE Network Capability IE as part of ATTACH REQUEST and TRACKING AREA UPDATE REQUEST messages.

Additional Example 4 may include the MME of Additional Example 2 and/or some other Additional Example herein, wherein the MME includes the CP Backoff Timer value IE in the ATTACH ACCEPT and TRACKING AREA UPDATE ACCEPT messages.

Additional Example 5 may include the UE of Additional Example 2 and/or some other Additional Example herein, wherein the UE sends CONTROL PLANE SERVICE REQUEST message with an ESM message container and indicates this as last downlink packet with no further uplink or downlink packets in Release Assistance Indication IE. The MME of Additional Example 2 in this case responds with SERVICE ACCEPT message with a control plane backoff timer.

Additional Example 6 may include the UE of Additional Example 2 and/or some other Additional Example herein, wherein the UE sends CONTROL PLANE SERVICE REQUEST message with an ESM message container and provides no further information in Release Assistance Indication IE. The MME of Additional Example 2 in this case responds with SERVICE REJECT message with a control plane backoff timer.

Additional Example 7 may include the MME of Additional Example 2 and/or some other Additional Example herein, wherein due to overload of the control plane the MME sends an Overload Start message to eNB and indicates to eNB to reject all RRC requests from UE to transfer user data via the control plane.

Additional Example 8 may include the eNB of Additional Example 7 and/or some other Additional Example herein, which includes the control plane back off timer as part of RRC CONNECTION REJECT and RRC CONNECTION RELEASE requests.

Additional Example 9 may include an apparatus comprising means to perform one or more elements of a method described in or related to any of Additional Examples 1-8, or any other method or process described herein.

Additional Example 10 may include one or more non-transitory computer-readable media comprising instructions to cause an electronic device, upon execution of the instructions by one or more processors of the electronic device, to perform one or more elements of a method described in or related to any of Additional Examples 1-8, or any other method or process described herein.

Additional Example 11 may include an apparatus comprising logic, modules, and/or circuitry to perform one or more elements of a method described in or related to any of Additional Examples 1-8, or any other method or process described herein.

Additional Example 12 may include a method, technique, or process as described in or related to any of Additional Examples 1-8, or portions or parts thereof Additional Example 13 may include an apparatus comprising: one or more processors and one or more computer readable media comprising instructions that, when executed by the one or more processors, cause the one or more processors to perform the method, techniques, or process as described in or related to any of Additional Examples 1-8, or portions thereof.

Additional Example 14 may include a method of communicating in a wireless network as shown and described herein.

Additional Example 15 may include a system for providing wireless communication as shown and described herein.

Additional Example 16 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Additional Embodiments

In some embodiments, handling of congestion control for transport of user data via the control plane is performed. The network may activate congestion control for transport of user data via the control plane.

If the congestion control for transport of user data via the control plane is active and if the UE has indicated support for the control plane data back-off timer, the network shall include a value for the control plane data back-off timer T3448 in ATTACH ACCEPT, TRACKING AREA UPDATE ACCEPT, SERVICE ACCEPT or SERVICE REJECT message, and shall store a control plane data back-off time on a per UE basis. The UE starts the timer T3448 with the value informed in the message. To avoid that large numbers of UEs simultaneously initiate deferred requests, the network should select the value for the timer T3448 for the informed UEs so that timeouts are not synchronised.

The network sends TRACKING AREA UPDATE ACCEPT message or SERVICE ACCEPT message without T3448 value IE to stop the timer T3448 running in the UE.

Based on the stored control plane data back-off time for the UE, the network may reject the transfer of user data via the control plane initiated by the UE.

While the timer T3448 is running, the UE in EMM-IDLE mode shall not initiate the transport of user data via a control plane procedure, except if the UE is allowed to use exception data reporting (see the ExceptionDataReportingAllowed leaf of the NAS configuration MO or the USIM file EFNASCONFIG) and the user data is related to an exceptional event.

Upon entering the state EMM-DEREGISTERED or a new PLMN which is not equivalent to the PLMN where the UE started the timer T3448, or upon being switched off while the timer T3448 is running, the UE shall stop the timer T3448.

In an example, attach procedure initiation can be used. In state EMM-DEREGISTERED, the UE initiates the attach procedure by sending an ATTACH REQUEST message to the MME, starting timer T3410 and entering state EMM-REGISTERED-INITIATED. If timer T3402 is currently running, the UE shall stop timer T3402. If timer T3411 is currently running, the UE shall stop timer T3411.

If the UE supports the control plane data back-off timer Txy, the UE shall set the CP backoff bit to "back-off timer for transport of user data via the control plane supported" in the UE network capability IE of the ATTACH REQUEST message.

In an example, attach can be accepted by the network. If the UE has indicated support for the control plane data back-off timer, and the MME decides to activate the congestion control for transport of user data via the control plane, then the MME shall include the T3448 value IE in the ATTACH ACCEPT message. If the T3448 value IE is present in the received ATTACH ACCEPT message, the UE shall: stop timer T3448 if it is running; and start timer T3448 with the value provided in the T3448 value IE. If the UE is using EPS services with control plane CIoT EPS optimization and if the T3448 value IE is present in the ATTACH ACCEPT message and the value indicates that this timer is either zero or deactivated, the UE shall consider this case as an abnormal case.

In an embodiment of normal and periodic tracking area updating procedure initiation, for all cases, except a case of when the periodic tracking area updating timer T3412 expires, if the UE supports the control plane data back-off timer T3448, the UE shall set the CP backoff bit to "backoff timer for transport of user data via the control plane supported" in the UE network capability IE of the TRACKING AREA UPDATE REQUEST message.

In an embodiment of normal and periodic tracking area updating procedure accepted by the network, if the UE has indicated support for the control plane data back-off timer, and the MME decides to activate the congestion control for transport of user data via the control plane, then the MME shall include the T3448 value IE in the TRACKING AREA UPDATE ACCEPT message. If the T3448 value IE is present in the received TRACKING AREA UPDATE ACCEPT message, the UE shall: stop timer T3448 if it is running; and start timer T3448 with the value provided in the T3448 value IE. If the UE is using EPS services with control plane CIoT EPS optimization and if the T3448 value IE is present in the TRACKING AREA UPDATE message and the value indicates that this timer is either zero or deactivated, the UE shall consider this case as an abnormal case. If the UE in EMM-IDLE mode initiated the tracking area update procedure and the TRACKING AREA UPDATE ACCEPT message does not include the T3448 value IE and if timer T3448 is running, then the UE shall stop timer T3448.

In an embodiment of abnormal cases in the UE, Timer T3448 is running. The UE shall not start the tracking area updating procedure with the "signalling active" flag unless: the UE is a UE configured to use AC11-15 in selected PLMN; the UE which is only using EPS services with control plane CIoT EPS optimization received a paging; or the UE in NB-S1 mode is requested by the upper layer to transmit user data related to an exceptional event and the UE is allowed to use exception data reporting (see the ExceptionDataReportingAllowed leaf of the NAS configuration MO in or the USIM file EFNASCONFIG). The UE stays in the current serving cell and applies the normal cell reselection process. The UE shall proceed as for abnormal cases.

In an embodiment of the UE using EPS services with control plane CIoT EPS optimization, if the MME sends a SERVICE ACCEPT message upon receipt of the CONTROL PLANE SERVICE REQUEST message piggybacked with the ESM DATA TRANSPORT message: if the Release assistance indication IE is set to "No further uplink or downlink data transmission subsequent to the uplink data transmission is expected" in the message; if the UE has indicated support for the control plane data back-off timer; and if the MME decides to activate the congestion control for transport of user data via the control plane, then the MME shall include the T3448 value IE in the SERVICE ACCEPT message. If the MME sends a SERVICE ACCEPT message and decides to deactivate congestion control for transport of user data via the control plane then the MME shall delete the stored control plane data back-off time for the UE and the MME shall not include timer T3448 value IE in SERVICE ACCEPT message.

If the T3448 value IE is present in the received SERVICE ACCEPT message, the UE shall: stop timer T3448 if it is running; consider the transport of user data via the control plane as successful; and start timer T3448 with the value provided in the T3448 value IE. If the UE is using EPS services with control plane CIoT EPS optimization and if the T3448 value IE is present in the SERVICE ACCEPT message and the value indicates that this timer is either zero or deactivated, the UE shall consider this case as an abnormal case. If the UE in EMM-IDLE mode initiated the service request procedure by sending a CONTROL PLANE SERVICE REQUEST message and the SERVICE ACCEPT message does not include the T3448 value IE and if timer T3448 is running, then the UE shall stop timer T3448.

In an embodiment, the service request procedure is not accepted by the network. If the MME sends a SERVICE REJECT message upon receipt of the CONTROL PLANE SERVICE REQUEST message piggybacked with the ESM DATA TRANSPORT message: if the Release assistance indication IE is not set to "No further uplink or downlink data transmission subsequent to the uplink data transmission is expected" in the message; if the UE has indicated a support for the control plane data back-off timer; and if the MME decides to activate the congestion control for transport of user data via the control plane, then the MME shall set the EMM cause value to #22 "congestion" and assign a value for control plane data back-off timer T3448.

If the UE is using EPS services with control plane CIoT EPS optimization and if the T3448 value IE is present in the SERVICE REJECT message and the value indicates that this timer is neither zero nor deactivated, the UE shall: stop timer T3448 if it is running; consider the transport of user data via the control plane as unsuccessful; and start timer T3448: with the value provided in the T3448 value IE if the SERVICE REJECT message is integrity protected; or with a random value from the default range specified if the SERVICE REJECT message is not integrity protected. If the UE is using EPS services with control plane CIoT EPS optimization and if the T3448 value IE is present in the SERVICE REJECT message and the value indicates that this timer is either zero or deactivated, the UE shall consider this case as an abnormal case.

In an embodiment, an abnormal case in the UE can exist. Timer T3448 is running. The UE in EMM-IDLE mode shall not initiate the procedure for transport of user data via the control plane unless: the UE is a UE configured to use AC11-15 in selected PLMN; or the UE in NB-S1 mode is requested by the upper layer to transmit user data related to an exceptional event and the UE is allowed to use exception data reporting (see the ExceptionDataReportingAllowed leaf of the NAS configuration MO in or the USIM file EFNASCONFIG). The UE stays in the current serving cell and applies the normal cell reselection process.

An attach accept message can come from the network to a UE. This message is sent by the network to the UE to indicate that the corresponding attach request has been accepted and can include the following content:

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Attach accept message identity | Message type 9.8 | M | V | 1 |
| | EPS attach result | EPS attach result 9.9.3.10 | M | V | 1/2 |
| | Spare half octet | Spare half octet 9.9.2.9 | M | V | 1/2 |
| | T3412 value | GPRS timer 9.9.3.16 | M | V | 1 |
| | TAI list | Tracking area identity list 9.9.3.33 | M | LV | 7-97 |
| | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3-4 |
| F- | Additional update result | Additional update result 9.9.3.0A | O | TV | 1 |
| 5E | T3412 extended value | GPRS timer 3 9.9.3.16B | O | TLV | 3 |
| 6A | T3324 value | GPRS timer 2 9.9.3.16A | O | TLV | 3 |
| 6E | Extended DRX parameters | Extended DRX parameters 9.9.3.46 | O | TLV | 3 |
| 65 | DCN-ID | DCN-ID 9.9.3.48 | O | TLV | 4 |
| E- | SMS services status | SMS services status 9.9.3.4B | O | TV | 1 |
| D- | Non-3GPP NW provided policies | Non-3GPP NW provided policies 9.9.3.49 | O | TV | 1 |
| 6B | T3448 value | GPRS timer 2 9.9.3.16A | | TLV | 3 |

The network may include a T3448 value IE if the congestion control for transport of user data via the control plane is active and the UE supports timer T3448.

A service reject message can come from the network to a UE. This message is sent by the network to the UE in order to reject the service request procedure and can include the following content:

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Service reject message identity | Message type 9.8 | M | V | 1 |
| | EMM cause | EMM cause 9.9.3.9 | M | V | 1 |
| 5B | T3442 value | GPRS timer 9.9.3.16 | C | TV | 2 |
| 5F | T3346 value | GPRS timer 2 9.9.3.16A | O | TLV | 3 |
| 6B | T3448 value | GPRS timer 2 9.9.3.16A | O | TLV | 3 |

The network may include a T3448 value IE if the congestion control for transport of user data via the control plane is active and the UE supports timer T3448.

A tracking area update accept message can come from the network to a UE. This message is sent by the network to the UE to provide the UE with EPS mobility management related data in response to a tracking area update request message and can include the following content:

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |

-continued

| IEI | Information Element | Type/Reference | Presence | Format | Length |
|---|---|---|---|---|---|
|  | Tracking area update accept message identity | Message type 9.8 | M | V | 1 |
|  | EPS update result | EPS update result 9.9.3.13 | M | V | 1/2 |
|  | Spare half octet | Spare half octet 9.9.2.9 | M | V | 1/2 |
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | 8-98 |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3-4 |
| F- | Additional update result | Additional update result 9.9.3.0A | O | TV | 1 |
| 5E | T3412 extended value | GPRS timer 3 9.9.3.16B | O | TLV | 3 |
| 6A | T3324 value | GPRS timer 2 9.9.3.16A | O | TLV | 3 |
| 6E | Extended DRX parameters | Extended DRX parameters 9.9.3.46 | O | TLV | 3 |
| 68 | Header compression configuration status | Header compression configuration status 9.9.4.27 | O | TLV | 4 |
| 65 | DCN-ID | DCN-ID 9.9.3.48 | O | TLV | 4 |
| E- | SMS services status | SMS services status 9.9.3.4B | O | TV | 1 |
| D- | Non-3GPP NW policies | Non-3GPP NW provided policies 9.9.3.49 | O | TV | 1 |
| 6B | T3448 value | GPRS timer 2 9.9.3.16A | O | TLV | 3 |

The network may include a T3448 value IE if the congestion control for transport of user data via the control plane is active and the UE supports timer T3448.

A service accept message can come from the network to a UE. This message is sent by the network in response to the CONTROL PLANE SERVICE REQUEST message and can include the following content:

| IEI | Information Element | Type/Reference | Presence | Format | Length |
|---|---|---|---|---|---|
|  | Protocol discriminator | Protocol discriminator 9.2 | M | V | 1/2 |
|  | Security header type | Security header type 9.3.1 | M | V | 1/2 |
|  | Service accept message identity | Message type 9.8 | M | V | 1 |
| 57 | EPS bearer context status | EPS bearer context status 9.9.2.1 | O | TLV | 4 |
| 6B | T3448 value | GPRS timer 2 9.9.3.16A | O | TLV | 3 |

The network may include a T3448 value IE if the congestion control for transport of user data via the control plane is active and the UE supports timer T3448.

In some embodiments, the purpose of the UE network capability information element is to provide the network with information concerning aspects of the UE related to EPS or interworking with GPRS. The contents might affect the manner in which the network handles the operation of the UE. The UE network capability information indicates general UE characteristics and it shall therefore, except for fields explicitly indicated, be independent of the frequency band of the channel it is sent on. The UE network capability information element is coded as follows:

| 8 | 7 | 6 | 5 | 4 | 3 | 2 | 1 |  |
|---|---|---|---|---|---|---|---|---|
| colspan=8: UE network capability IEI |||||||| octet 1 |
| colspan=8: Length of UE network capability contents |||||||| octet 2 |
| EEA0 | 128-EEA1 | 128-EEA2 | 128-EEA3 | EEA4 | EEA5 | EEA6 | EEA7 | octet 3 |
| EIA0 | 128-EIA1 | 128-EIA2 | 128-EIA3 | EIA4 | EIA5 | EIA6 | EIA7 | octet 4 |
| UEA0 | UEA1 | UEA2 | UEA3 | UEA4 | UEA5 | UEA6 | UEA7 | octet 5 |
| UCS2 | UIA1 | UIA2 | UIA3 | UIA4 | UIA5 | UIA6 | UIA7 | octet 6 |
| ProSe-dd | ProSe | H.245-ASH | ACC-CSFB | LPP | LCS | 1 × SR VCC | NF | octet 7 |
| ePCO | HC-CP CIoT | ERw/oPDN | S1-U data | UP CIoT | CP CIoT | ProSe-relay | ProSe-dc | octet 8 |
| 0 Spare | 0 Spare | 0 Spare | 0 Spare | CP backoff | Restrict EC | V2X PC5 | multiple DRB | octet 9 |
| 0 | 0 | 0 | 0 | 0 | 0 | 0 | 0 | octets 10-15 |
| colspan=8: Spare ||||||||  |

Control plane data backoff support (CP backoff) (octet 9, bit 4) indicates the support of back-off timer for transport of user data via the control plane. When the bit is 0, the back-off timer for transport of user data via the control plane is not supported. When the bit is 1, the back-off timer for transport of user data via the control plane is supported.

In an embodiment, a timer of EPS mobility management includes a CP backoff timer.

| TIMER NUM. | TIMER VALUE | STATE | CAUSE OF START | NORMAL STOP | ON EXPIRY |
|---|---|---|---|---|---|
| T3448 | NOTE 10 | All except EMM-NULL | ATTACH ACCEPT message or TRACKING AREA UPDATE ACCEPT message or SERVICE ACCEPT message received with a non-zero T3448 value. SERVICE REJECT message received with EMM cause #22 "Congestion" and a non-zero T3448 value. | SERVICE ACCEPT message or TRACKING AREA UPDATE ACCEPT message received without T3448 value | Allowed to initiate transfer of user data via the control plane |

The T3448 timer value can be provided by the network in the ATTACH ACCEPT, TRACKING AREA UPDATE ACCEPT, SERVICE ACCEPT or SERVICE REJECT message, or chosen randomly from a default value range of 15-30 minutes.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device (s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined only by the following claims.

The invention claimed is:

1. A method of congestion control for transport of user data via a control plane, the method comprising:
 generating, for a mobility management entity (MME), an indication of support for a control plane data backoff timer associated with transport of user data via the control plane;

generating a control plane message that includes the user data for transmission to the MME, wherein the control plane message comprises a control plane service request (CPSR) message with an evolved packet system session management (ESM) container that includes the user data, and wherein the CPSR message includes a routing area identification (RAI) information element (IE) indicating that no further data is to be sent;

processing a response to the control plane message that includes the control plane data backoff timer value from the MME, wherein processing the response to the control plane message comprises:

processing either a service accept message or a service reject message from the MIME;

in response to the service accept message, considering a transport of the user data via the control plane as successful; and in response to the service reject message:
considering the transport of the user data via the control plane as unsuccessful;
stopping the control plane data backoff timer, if running;
if the service reject message is integrity protected, starting the control plane data backoff timer with the control plane data backoff timer value from the MME; and
if the service reject message is not integrity protected, starting the control plane data backoff timer with a random value from a default range; and not initiating transmissions of further control plane messages with user data to the MME until after expiration of the control plane data backoff timer.

2. The method of claim 1, wherein the indication of support for the control plane data backoff timer is provided in a UE network capability information element (IE) in an attach request or tracking area update request.

3. The method of claim 1, wherein the processor is a baseband processor.

4. An apparatus for a user equipment (UE), comprising:
a timer interface to send and receive a control plane data backoff timer value from memory or storage, the control plane backoff timer associated with transport of user data via a control plane;

a processor coupled to the timer interface, the processor configured to:
generate an outgoing control plane message for transmission to a mobility management entity (MME), wherein the control plane message comprises a control plane service request (CPSR) message with an evolved packet system session management (ESM) container that includes the user data, and wherein the CPSR message includes a routing area identification (RAI) information element (IE) indicating that no further data is to be sent;

process an incoming control plane message that includes a control plane data backoff timer value from the MME, wherein to process the response to the control plane message comprises:

process either a service accept message or a service reject message from the MME;

in response to the service accept message, consider a transport of the user data via the control plane as successful; and in response to the service reject message:
consider the transport of the user data via the control plane as unsuccessful;
stop the control plane data backoff timer, if running;
if the service reject message is integrity protected, start the control plane data backoff timer with the control plane data backoff timer value from the MME; and
if the service reject message is not integrity protected, start the control plane data backoff timer with a random value from a default range; and not initiate transmissions of control plane messages with user data to the MME until after expiration of the backoff timer.

5. The apparatus of claim 4, wherein the processor is further configured to generate, for a mobility management entity, an indication of support for a control plane data backoff timer for control plane user data transmissions.

6. The apparatus of claim 4, wherein the outgoing control plane message is a control plane service request, attach request, or tracking area update request.

7. The apparatus of claim 4, wherein the incoming control plane message includes an information element indicating support for the control plane data back-off timer.

* * * * *